United States Patent [19]

Lindner

[11] Patent Number: 5,140,940
[45] Date of Patent: Aug. 25, 1992

[54] APPARATUS FOR DEPOSITING A METAL-OXIDE COATING ON GLASS ARTICLES

[75] Inventor: Georg H. Lindner, Vlissingen, Netherlands

[73] Assignee: Atochem North America, Inc., Philadelphia, Pa.

[21] Appl. No.: 638,854

[22] Filed: Jan. 8, 1991

[51] Int. Cl.⁵ .............................................. C23C 16/00
[52] U.S. Cl. ..................................... 118/724; 118/715; 427/255
[58] Field of Search ................. 427/255; 118/715, 724

[56] References Cited

U.S. PATENT DOCUMENTS

| | | | |
|---|---|---|---|
| 3,516,811 | 6/1970 | Gatchet | 427/255 |
| 4,431,692 | 2/1984 | Hofmann | 427/255 |
| 4,529,627 | 7/1985 | Zurbig | 427/255 |
| 4,615,916 | 10/1986 | Henderson | 427/255 |

Primary Examiner—Richard Bueker
Attorney, Agent, or Firm—Stanley A. Marcus; Robert B. Henn

[57] ABSTRACT

A hood for coating glass articles has side walls and a top part, forming a tunnel through which hot glass articles pass; blowing and suction channels in the active part of the hood are formed to present substantial line contacts facing the ware being coated. By introducing relatively large radiating surfaces, the buildup of reaction-product crust on the interior of the apparatus is minimized.

5 Claims, 2 Drawing Sheets

APPARATUS FOR DEPOSITING A METAL-OXIDE COATING ON GLASS ARTICLES

BACKGROUND OF THE INVENTION

1. Field of the Invention

This invention is in the field of methods and apparatus for coating a substrate with a metal oxide coating by pyrolitic decomposition of a metal compound on the hot glass surface. More particularly, the invention is in the field of hoods for applying protective coating to hollow glass containers.

2. Description of the Prior Art

The desirability of applying protective coatings to glass in general and to the exterior of hollow glass containers in particular has long been recognized. Such coatings, which include those resulting from the application of tin, titanium and other metallic compounds, or other heat-decomposable organometallic compounds, protect the glass surface from damage such as from abrasion and scratches which cause a loss of tensile strength of the glass containers. The need for high tensile strength in, e.g., glass containers is particularly acute when the containers are mass-produced, move rapidly in close proximity along high-speed conveyor lines, and are subsequently filled with carbonated beverages, beer, wine, foodstuffs, and the like which can produce gaseous pressure within the container. Protective coatings are usually applied as the glass articles, generally containers, emerge in a heated, fully-shaped condition from a glassware-forming machine, that is, at the "hot" end of the system. The containers are thereafter transported away from the forming machine by a conveyor. Temperatures in excess of 400 degrees Centigrade (°C.) exist at the surface of the glass containers, such that when a heat-decomposable inorganic metallic or organometallic compound is applied to those surfaces, the compound decomposes and is converted to a metallic-oxide coating.

One well-known and previously widely used technique for applying a protective coating to the hot glass containers calls for spraying the opposite sides of the containers as they travel on a conveyor in single file through spray heads positioned for optimal coating of the glass surface of a particular container. Receivers are positioned on the opposite side of the conveyor in alignment with the respective spray heads. Pressurized air or inert gas with the coating compound entrained therein is discharged from one or a plurality of spray heads at a significant positive pressure, while the receivers are usually maintained at a relatively low pressure. The resultant pressure differential increases the velocity, and thus the effectiveness, of the coating-precursor compound. Coating system of this nature are disclosed, inter alia, in U.S. Pat. No. 3,516,811, to Gatchet, et al., and U.S. Pat. No. 3,684,469, to Goetzer, et al.

Gatchet, et al. recognized that the deposition of a metallic-oxide coating on the finish of the glass container passing on a conveyor through the open-sided coating apparatus of the prior art was undesirable, as noted in column 3, lines 21-57 of U.S. Pat. No. 3,516,811. Gatchet, et al. relied upon spray heads producing a theoretically laminar flow which would pass laterally across the width of the conveyor to control the location as well as the uniformity of the metal-oxide deposit, as shown in FIG. 4 of that patent.

The above-described coating systems, however, are what may be termed "open-sided," and are thus adversely influenced by ambient conditions in the facility where the glass containers are formed. The ambient conditions of prime concern are rapidly-moving air currents, moisture in the air, and the potentially toxic and corrosive fumes and pollutants being discharged from the spray heads. Air currents can cause turbulent conditions at the spray heads, which can in turn result in a preferential or uneven application of the protective coating. Some of the coating will therefore accumulate on the bottle "finish", the term used in the industry to designate the closure region of the bottle. The rapidly-moving air currents disrupt the laminar-flow patterns which are theoretically possible with open-sided systems, and the capability for uniformly, and consistently, applying the same thickness of coating is seriously reduced.

To compensate for air currents as described above, the systems are therefore operated at higher pressures, and with the use of greater amounts of coating compound, than would be required under quiescent conditions. The necessary result of process adjustments such as these is the use of greater amounts of coating compound than required for optimum economy.

The mositure in the hostile atmosphere described above causes hydrolysis loss, thus rendering some of the compound unfit for its intended purpose. Further, the escape of potentially toxic fumes into the atmosphere at the work place can constitute an occupational health hazard, and may also be a violation of applicable law. These fumes are also generally quite corrosive, and can attack various components of the glass factory, such as, e.g., blowers, exhaust systems, conveyors and roofs, obviously leading to increased plant-maintenance costs. Additionally, the efficiency of these open-sided systems is low, since much of the relatively expensive coating compound is wasted.

A second, well-known, and widely employed technique for applying a protective coating to hot glass containers relies upon a formed sheet-metal coating hood with spray heads and associated receivers situated therein. The hood obviates many of the problems associated with the open-ended spray systems discussed above. For example, it isolates the glass containers from ambient conditions, and furnishes a controlled atmosphere which enhances the coating operations. The hood includes an exhaust system which captures most of the air-entrained coating compound not adhering to the containers, thus reducing the problem of venting the system and minimizing the opportunity for the coating compound to attack building components. Also, that hood can significantly raise the coating efficiency of the systems, with attendant cost savings.

Coating hoods substantially representative of the prior art are disclosed in U.S. Pat. No. 3,819,404 to Scholes et al.; U.S. Pat. No. 3,933,457, to Scholes; and U.S. Pat. No. 4,389,234 to Lindner. The most recent patent to Lindner, et al. presents a coating hood including a tunnel for allowing containers to pass therethrough, and a vertically adjustable flat roof for accommodating containers of various sizes. At least two jet slots are located in each side wall, and at least two receivers or suction slots are aligned therewith. The jet and suction slots are interspersed opposite each other in each sidewall. The coating compound is introduced through at least one feedpoint, and blowers secured to the sidewalls furnish an inner and an outer loop of high-velocity air, of which the inner loop contains the coating compound, to the interior of the hood. Baffles are situated in the flow path of the high-velocity air so that the jets issuing from the jet slots are well defined, and thus better suited for their intended function.

SUMMARY OF THE INVENTION

The present invention is an apparatus for coating of glass with a metal oxide coating, using chemical vapor deposition (CVD) at atmospheric pressure, characterized by having at least two side walls and a top part, forming a tunnel through which hot glass articles pass; a circulating carrier gas in which a coating chemical is evaporated, whereby a metal oxide film is formed on the surface of the glass articles; means for circulating the carrier gas, there being blowing and suction channels in the active part of the hood formed in such way that no inner sidewall exists inside the tunnel, other than the line contacts between the walls of adjacent blowing and suction channels, the blowing and suction channels with line contact facing the glass articles having openings between them through which cooling air passes.

DESCRIPTION OF THE PREFERRED EMBODIMENTS

The present invention comprises apparatus for coating glass articles, the apparatus having at least two side walls and a top part which form a tunnel through which hot glass articles pass; a circulating carrier gas with a coating chemical is caused to impinge on the glass surface, whereby a metal oxide film is formed on the surface of the glass articles. The apparatus has means for circulating the carrier gas, with blowing and suction channels in the active, or coating, portion of the hood being formed in such way that there is no flat inner sidewall inside the tunnel, other than line, or edge, contacts between the walls of adjacent blowing and suction channels, the blowing and suction channels with line contact facing the glass articles having openings between them through which cooling air can pass.

This invention is applicable to the common case of coating bottles using monobutyltinchloride (MBTC); however, the apparatus described herein is applicable generally to the coating of glass with films of tin oxide, titanium oxide or other single metal oxide, or with a mixture of a plurality thereof, using organometallic compounds, metal halides or other suitable compounds as the coating-chemical precursor.

In other embodiments of the invention, single or multiple air-circulating loops are provided, cooling air is forced by a blower through openings between blowing channels and between suction channels, and a liquid cooling medium is used to cool the suction and blowing channels from the outside.

Figure 1:
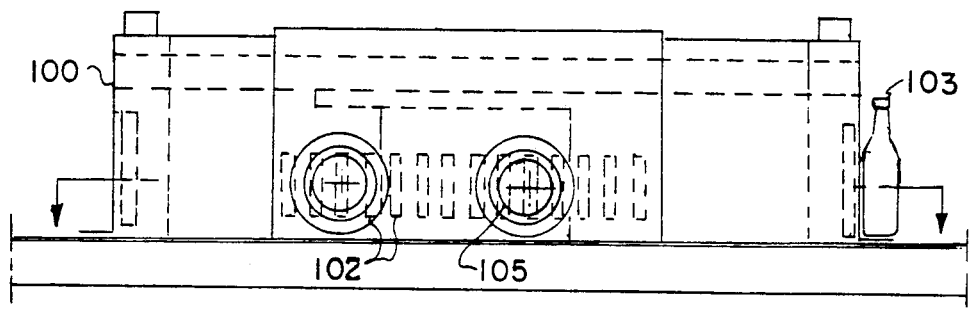
FIG. 1 shows a prior-art coating hood for bottles or jars, the hood having a flat inner wall with vapor slots.
Figure 2:
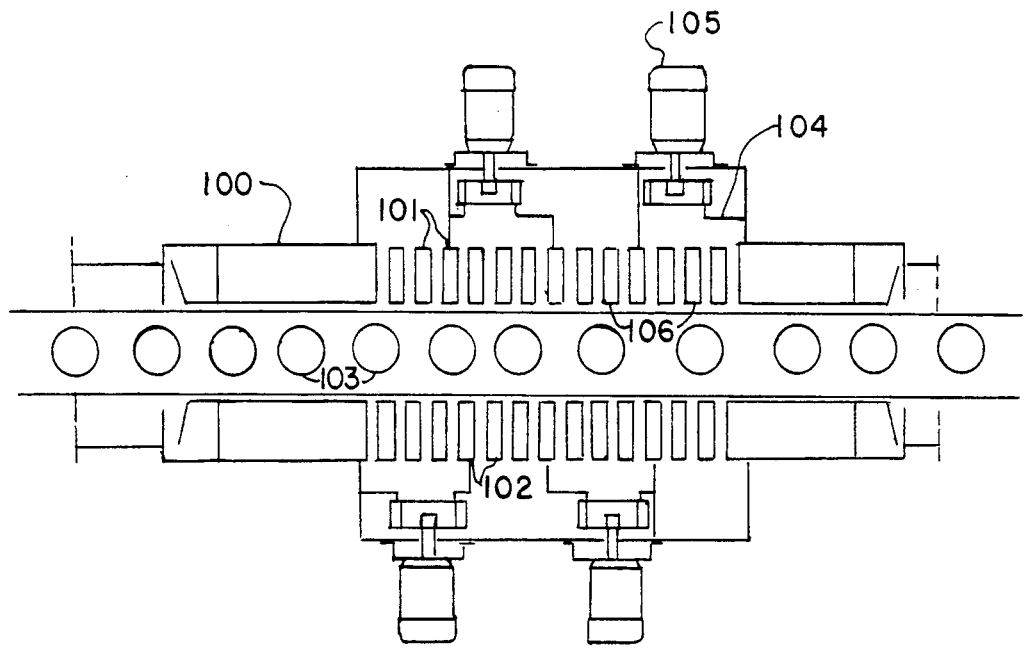
FIG. 2 is a plan view taken along lines 2—2 of FIG. 1.

The present invention will be best understood by a brief initial discussion of a coating hood of the prior art. FIGS. 1 and 2 show a partially schematic view of a double-vapor-loop coating hood 100 for bottles according to U.S. Pat. No. 4,389,234. Each vapor loop has blowing slots 101, and on the opposite side of the conveyor, suction slots 102, which guide the circulating vapors at high velocity against the passing bottles 103. The liquid coating chemical is fed to each side of the hood through pipes 104 by blowers 105 from appropriate supply sources not shown here, but known to those skilled in the art. Bottles coated in this type of hood using MBTC receive a uniform tin oxide coating at a relatively low chemical consumption. However, such hoods nevertheless require cleaning from time to time to remove crust from the interior, in order to maintain proper coating efficiency. The blowing slots 101 and suction slots 102 have flat sides 106. Under the conditions of high temperature encountered in forming glass articles, side 106 become hot due to the radiation of substantial amounts of heat from the bottles 103.

In the coating application of the hood shown in FIG. 1, the circulating vapors can become quite hot, and as noted abouve in such cases, buildup of a metal oxide crust is found on the inner walls of the hood and on the inside of suction slots 102.

Figure 3:
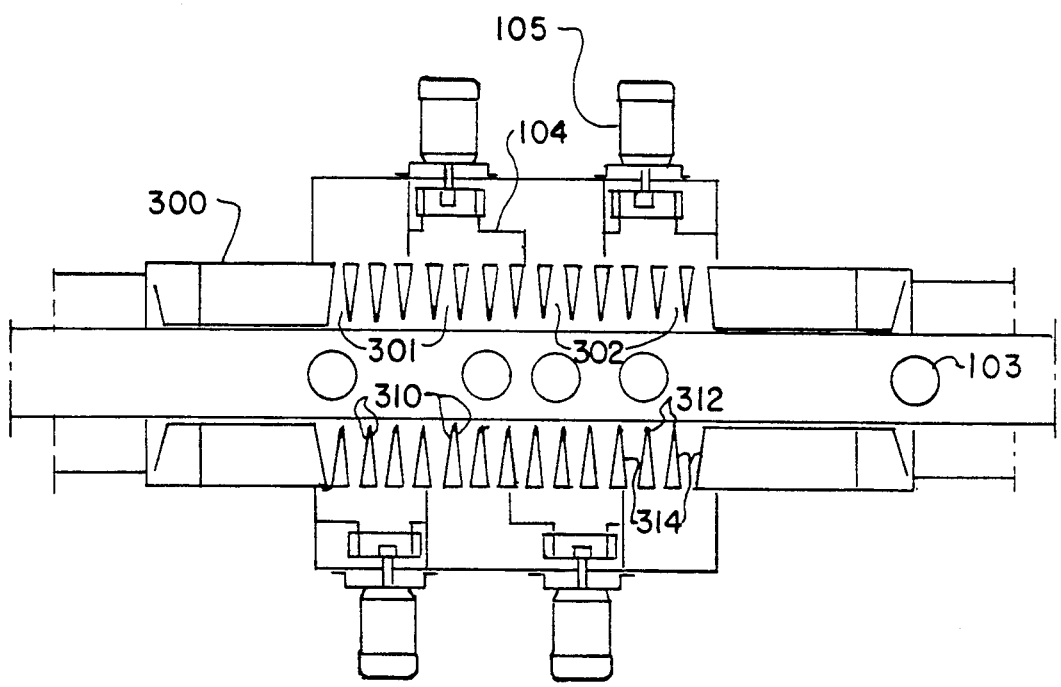
FIG. 3 is a plan view showing a coating hood according to this invention, having an inner-wall configuration designed to reduce inner surface temperature.

Turning now to FIG. 3, there is shown a double-loop coating hood 300 which is similar to the high-efficiency conventional coating hood of the prior art, depicted in FIGS. 1 and 2. It has surprisingly been discovered that by changing the configuration of slots 101 and 102, a substantial improvement in the economy of production of glass articles can be effected.

In FIG. 3, the coating hood of this invention is shown generally at 300. Blowing slots 101 and suction slots 102 of FIGS. 1 and 2 are modified as shown for blowing slots 301 and suction slots 302 in hood 300, the modification being shown as the elimination of the flat side 106, such that the side walls 310 of the blowing slots 301 and suction slots 302 meet in vertical lines 312 in the interior of the hood.

As a result of the conformation of the blowing slots 301 and suction slots 302, thermal radiation from the hot bottles is spread over the inner surfaces 314 of the walls of the blowing and suction slots. Because this surface is significantly larger than the inner-wall surface of the conventional coating hood of FIG. 1, the radiation energy per unit of wall surface is reduced to by a factor which is a function of the ration of the wall surfaces of the respective slots; in the case of the present invention, that factor is one-third of the energy of the conventional hood. Therefore, the inner surface temperature in the active part of the hood is from about 50° to about 150° C. lower than in a conventional hood. This has surprisingly been found to cause appreciably lower crust buildup and therefore less need for cleaning.

Apart from the active coating zone, flat wall parts in the coating apparatus can also be made from wedged wall parts as in the active zone, to reduce crust formation. The same circumstance is true for the top part where a flat ceiling can be formed of wedged parts. Those skilled in the art will now recognize that instead of vertical slots with vertical walls, slots can be of any form with wall, ceiling or floor wedges in any position, the desideratum being the presentation of edges to the ware, rather than flat radiating surfaces. Further, the orientation of the wedges need not be uniform.

In a determination of the utility of the present invention, a coating hood as described herein was installed on a production line for glass bottles. The line was producing beer bottles of 33 centiliters each, having a diameter of 66 millimeters (mm), a height of 160 mm, and weighing 150 g. The production rate was 470 bottles per minute. The coating hood had an overall length of 1.3 meters and a width of 160 mm. The length of the active airflow zone was 900 mm.

The hood ran for eight weeks before being inspected. On opening the hood, no crust formation was found. Some pieces of glass were removed from the suction slots, but this was without effect on the operation per se.

After another eight weeks of operation, the hood was inspected again and showed no crust formation, but only a loose, dusty tin oxide powder, which was easily cleaned out. Throughout the operation of the hood as described here, crust buildup, as generally encountered with coating apparatus of the prior art as described with respect to FIGS. 1 and 2, was minimal, and downtime and cleanup was substantially less than with previous hoods.

Modifications and improvements to the preferred forms of the invention disclosed and described herein may occur to those skilled in the art who come to understand the principles and precepts hereof. Accordingly, the scope of the patent to be issued hereon should not be limited solely to the embodiments of the invention set forth herein, but rather should be limited only by the advance by which the invention has promoted the art.

What is claimed is:

1. In apparatus for coating glass articles characterized by having at least two side walls and a top part, forming a tunnel through which hot glass articles pass, a circulating carrier gas in which a coating chemical is evaporated, whereby a metal oxide film is formed on the surface of the glass articles, and means for circulating the carrier gas, the improvement which comprises forming blowing and suction channels in the active part of the hood in such fashion that no inner sidewall exists inside the tunnel, except for line contacts between the walls of adjacent blowing and suction channels, the blowing and suction channels with line contact facing the glass articles having openings between them through which cooling air can pass.

2. A coating hood according to claim 1 having an air-circulating loop.

3. A coating hood according to claim 1 having a plurality of air-circulating loops.

4. A coating hood according to claim 1 wherein cooling air is forced by a blower through openings between blowing channels and between suction channels.

5. A coating hood according to claim 1 wherein a liquid cooling medium is used to cool the suction and blowing channels from the outside.

* * * * *